J. BEST.
NUT LOCK.
APPLICATION FILED APR. 26, 1920.

1,363,710.

Patented Dec. 28, 1920.

INVENTOR
John Best
By Kay & Totten
attys

UNITED STATES PATENT OFFICE.

JOHN BEST, OF PITTSBURGH, PENNSYLVANIA.

NUT-LOCK.

1,363,710.   Specification of Letters Patent.   Patented Dec. 28, 1920.

Application filed April 26, 1920.  Serial No. 376,669.

*To all whom it may concern:*

Be it known that I, JOHN BEST, a citizen of the United States, and resident of Pittsburgh, in the county of Allegheny and State of Pennsylvania, have invented a new and useful Improvement in Nut-Locks; and I do hereby declare the following to be a full, clear, and exact description thereof.

My invention relates to nut-locks.

The object of my invention is to provide a nut-lock which is sure and effective in locking the nut on the bolt where the same is subjected to great vibration, as in railway tracks, and at the same time one which is simple in construction, and which may be readily adjusted in position and quickly removed.

To these ends my invention comprises the novel features hereinafter set forth and claimed.

Figure 1:
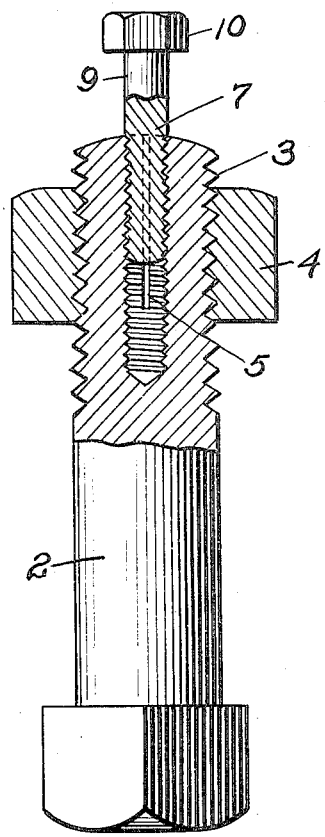
Figure 2:
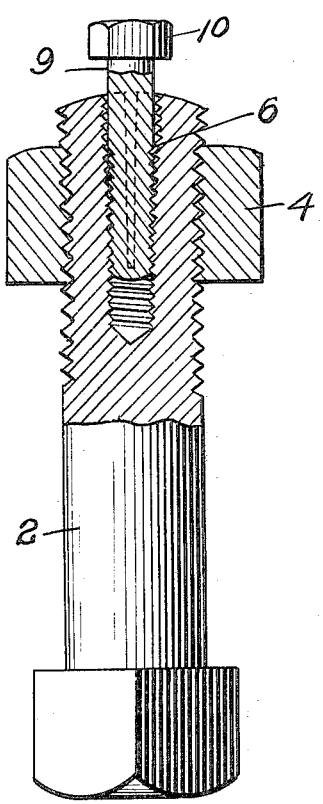
Figure 3:
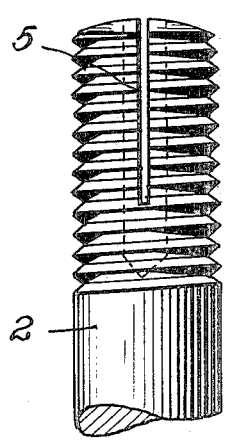
Figure 4:
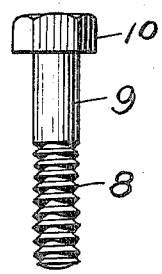

In the accompanying drawing, Figure 1 is a view partly in vertical section showing my improved nut-lock with the parts in unlocked position; Fig. 2 is a like view with the parts in locked position; Fig. 3 is a view of a portion of the threaded end of the bolt; and Fig. 4 is a view of the locking screw removed.

In the drawing, the numeral 2 designates a bolt of proper size and dimensions, said bolt having the customary threaded portion 3 for receiving the nut 4.

The outer end of the bolt is slotted to form the slot 5 extending entirely through the bolt and extending a proper distance down into the shaft of said bolt, permitting of the expansion of the bolt in a manner more fully hereinafter set forth.

Formed within the shank of the bolt is the threaded seat 6 which extends in beyond the slot 5, said threaded seat to receive the locking screw 7. The locking screw has the threads 8 formed thereon and the straight shank portion 9 above said threads. The head 10 may be the ordinary hexagonal form adapted to be engaged by wrench or other tool or, if desired, the head may have an ordinary screw-head.

When my improved nut-lock is in use, the bolt 2 having been inserted through the web of the rail and the ordinary fish-plate of a rail-track, the nut 4 is applied and screwed up into engagement with the fish-plate whereupon the locking screw 7 is screwed into the threaded-seat 6. The screwing of the screw 7 is continued until the straight portion 9 of the shank of the screw is forced down into the seat 6, the said straight portion engaging the threads of the seat 6 thereby expanding the ends of the bolt due to the slots 5, as clearly shown in Fig. 2. The threads will bite into the straight shank portion of the locking-screw and will act to bind said screw against rotation, and thus prevent its working loose. This expansion of the ends of the bolt will act to bind the nut securely on the bolt and prevent its rotation and consequently its working loose. Any tendency of the nut 4 to unscrew will only act to bind the locking-screw more securely in place, and so prevent any yielding on the part of the outer end of the bolt to permit the further unscrewing of the nut.

While the nut is held rigidly in position against turning, it is a very simple matter to release the nut as the withdrawal of the screw 7 will cause the parts to assume their normal position and the nut may be readily unscrewed from the bolt.

By my invention I provide a nut-lock which is securely and efficiently locked in place, and in such manner that the constant vibration such as nuts are subjected to on railway-tracks will not act to loosen the nut. This is due to the gripping action of the threads in the seat 6 biting into and engaging the straight shank portion of the locking screw and acting to positively lock the same in position.

What I claim is:

In a nut-lock, the combination of a bolt having a longitudinally slotted end portion with a threaded seat formed therein, a nut, and a locking-screw engaging said threaded seat, said locking-screw having a straight shank portion adapted to engage the threads of said seat and expand the slotted end of said bolt.

In testimony whereof, I, the said JOHN BEST, have hereunto set my hand.

JOHN BEST.

Witnesses:
ROBT. D. TOTTEN,
JOHN F. WILL.